United States Patent [19]

Shioura et al.

[11] Patent Number: 5,017,205
[45] Date of Patent: May 21, 1991

[54] NOZZLE PLATE FOR SPINNING GLASS FIBRES

[75] Inventors: Kozo Shioura, Fukushima; Hideo Taguchi, Nihonmatsu, both of Japan

[73] Assignee: Nitto Boseki Co., Ltd., Fukushima, Japan

[21] Appl. No.: 502,178

[22] Filed: Mar. 30, 1990

[30] Foreign Application Priority Data

Apr. 14, 1989 [JP] Japan .................................. 01-094755

[51] Int. Cl.⁵ .......................................... C03B 37/095
[52] U.S. Cl. ........................................ 65/1; 65/374.12
[58] Field of Search ............................. 65/1, 2, 374.12

[56] References Cited

U.S. PATENT DOCUMENTS

| | | | |
|---|---|---|---|
| 3,514,841 | 6/1970 | Woodward et al. | 65/1 X |
| 3,526,487 | 9/1970 | Bour | 65/1 |
| 4,121,918 | 10/1978 | Shono et al. | 65/1 |

FOREIGN PATENT DOCUMENTS

| | | |
|---|---|---|
| 1144886 | 3/1963 | Fed. Rep. of Germany . |
| 2359088 | 7/1977 | France . |
| 2362088 | 8/1977 | France . |
| 1242921 | 8/1971 | United Kingdom ............ 65/1 |

Primary Examiner—Robert L. Lindsay
Attorney, Agent, or Firm—Darby & Darby

[57] ABSTRACT

A nozzle plate for spinning glass fiber including a flat plate portion and a multiplicity of nozzles projecting from the flat plate portion. Each of the nozzles comprises a greater diameter portion located at its flat plate portion side and a smaller diameter portion located at its tip side. The smaller diameter portion has an inner diameter of 0.3 mm to 1.0 mm and a length of 0.5 mm to 2.0 mm, and the greater diameter portion has an inner diameter of 1.1 mm to 2.5 mm, and the length of the nozzle projecting from the flat plate portion is in range of 4.0 mm to 6.0 mm. By use of this nozzle plate for spining glass fiber, a fine glass fiber having a diameter smaller than 3 μm can be manufactured in a stable manner.

9 Claims, 1 Drawing Sheet

NOZZLE PLATE FOR SPINNING GLASS FIBRES

BACKGROUND OF THE INVENTION

1. FIELD OF THE INVENTION

The present invention relates to a nozzle plate for spinning glass fibres used in a glass fibre manufacturing apparatus.

2. DESCRIPTION OF THE PRIOR ART

Glass fibres having diameter of 9 to 23 $\mu$m are used in large quantities in form of glass cloth or glass mat as a basic material for FRP or printed circuit boards. These glass fibres are manufactured through a method in which molten glass is extruded through nozzle holes formed in a nozzle plate for spinning glass fibres and taken up with a predetermined speed by means of a take-up device. As partly shown in FIG. 3, the nozzle plate used here is formed with a nozzle 2 projecting from a flat plate portion 1, and the nozzle 2 is formed with a straight nozzle hole 3. The molten glass 4 flows out through the nozzle hole 3 and forms a cone 5 at the tip of the nozzle, and the cone is drawn downwards, thereby attenuating the glass flow and producing a glass fibre 6. Usually, the diameter d of the nozzle hole is in range of 1.0 mm to 2.5 mm, the length l of the straight portion of the nozzle hole is in range of 2 mm to 6 mm, the nozzle projecting length L is in range 3 mm to 6 mm, and the thickness t of the nozzle is about 0.3 mm.

Recently, by virtue of the advance in the glass fibre making art, it become possible to manufacture a glass fibre of about 3 $\mu$m by use of a glass fibre spinning nozzle of a straight type of a prior art such as shown in FIG. 3. However, it is difficult to manufacture a glass fibre thinner than the above, which can be used as a spacer for a liquid crystal display.

The manufacturing difficulty is caused not only by the fact that the glass fibre itself is fine and easily broken, but also by problems included in the fibre attenuating method. For obtaining a thinner fibre, there are methods such as a method in which the diameter of the nozzle hole is decreased for decreasing the flow rate of the molten glass, another method in which the spinning speed (drawing speed) of the glass fibre is increased, and a combination of these methods.

Although the diameter of the fibre can be decreased by increasing the spinning speed, the fibre is frequently broken in spinning at a high speed, because the fibre is formed by drawing the cone of the molten glass at high speed, which molten glass flows out through the nozzle at low speed, and the strength of each fibre is low. Therefore, actually, the spinning speed can not be increased beyond 2,500 m/min and a limit exists in decreasing the diameter of the fibre manufactured by use of a nozzle hole having a rather greater diameter.

On the other hand, in the method in which the diameter of the nozzle hole is decreased for decreasing the flow rate of the molten glass, the molten glass is apt to be influenced by environmental conditions when the molten glass passes through the narrow nozzle. For example, there is caused a problem that the molten glass is rapidly cooled under the influence of the disturbed air around the nozzle and stops to flow out through the nozzle, thereby causing a breakdown of the glass fibre. When the glass fibre drawn from the nozzle hole has broken, the molten glass flowing out through the nozzle hole forms a drop at the tip of the nozzle, and when the drop grows up to a certain amount, the drop separates from the tip of the nozzle and falls down, thereby forming a cone of the molten glass at the tip of the nozzle and producing again a glass fibre continuous to the cone. In case of the nozzle of decreased hole diameter, the flow rate of the molten glass is small, and it takes a long time for the drop of the molten glass to grow to an amount sufficient to fall down. In this process, the molten glass 4 adheres even to the outer surface of the nozzle 2 as shown in FIG. 4, and does not easily fall down. In an extreme case, the molten glass extends over the outer surface of the nozzle up to the flat plate portion of the nozzle, and forms no drop, but adheres totally to the lower surface of the nozzle plate. As a result, the glass fibre spinning process can not be reopened. In case of reopening the glass fibre spinning process by high-handedly separating the molten glass adhered to the top of the nozzle from the nozzle by using such as tweezers, as shown in FIG. 5, the outer diameter of the cone 5, become greater due to the molten glass wetting the outer surface of the nozzle, and the molten glass stays on the outer peripheral portion of the cone. This staying molten glass is cooled by the atmospheric air, and the viscosity of the glass become greater. Since the molten glass thus having high viscosity mixes intermittently with the glass flow for forming a fibre, the cone become unstable and the fibre has a great fluctuation in its diameter and is apt to be easily broken.

SUMMARY OF THE INVENTION

The present invention is intended to solve the above-mentioned problems of prior arts, and to provide a nozzle plate for spinning glass fibre capable of stably producing a glass fibre having a diameter smaller than 3 $\mu$m.

The inventor of the present invention has noticed that the molten glass flows in a stable manner by making the nozzle narrow only at its tip portion, even if the flow rate of the glass is small, and the forming of the drop of the molten glass and falling down of the same are stabilized by providing an outer surface of the nozzle which is difficult to be wetted by the molten glass. The present invention has been developed based on this discovery.

According to the present invention, there is provided a nozzle plate for spinning glass fibres which includes a multiplicity of nozzles projecting from a flat plate portion of the plate, and each of the nozzles is composed of a greater diameter portion located on its flat plate portion side and a smaller diameter portion located on its tip side, the smaller diameter portion having an inner diameter in range of 0.3 mm to 1.0 mm and a length in range of 0.5 mm to 2.0 mm, the greater diameter portion having an inner diameter in range of 1.1 mm to 2.5 mm, and the length of the nozzle projecting from the flat plate portion being in range of 4.0 mm to 6.0 mm.

In the nozzle plate having the above-mentioned structural features, it is preferred to cover the peripheral portion of the nozzle exit and the nozzle peripheral portion adjacent thereto with a metallic material having a contact angle greater than 58 degrees against the molten glass in temperature range of 1100° C. to 1500° C.

The present invention will be described further in detail by referring to the drawings.

DESCRIPTION OF THE PREFERRED EMBODIMENTS

Figure 1:
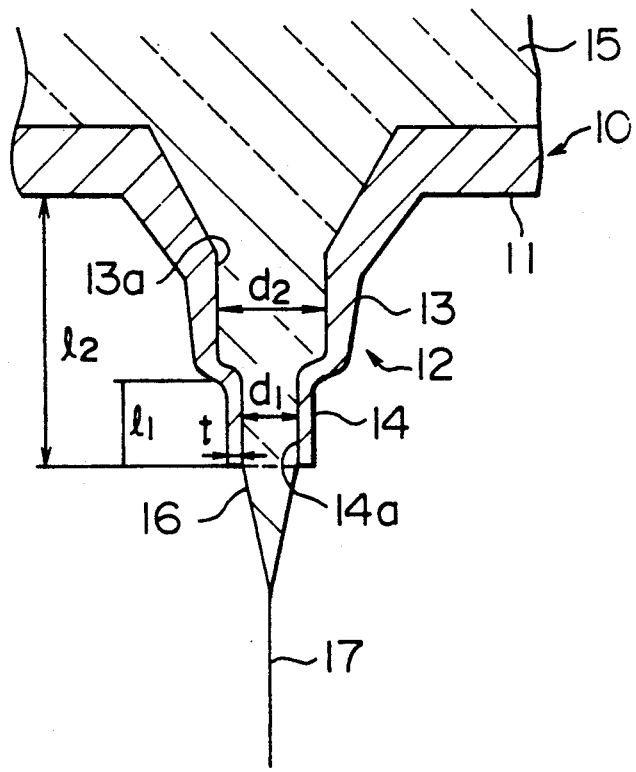
FIG. 1 is an enlarged sectional view of main part of a nozzle plate according to the present invention.

FIG. 1 is an enlarged sectional view of a nozzle portion of a nozzle plate according to the present invention. The nozzle plate indicated as a whole with reference numeral 10 comprises a flat plate portion 11 and a multiplicity of nozzles 12 (one of them is only shown in the figure) projecting from the flat plate portion. The nozzle 12 is composed of a greater diameter portion 13 located on the flat plate portion side and a smaller diameter portion 14 located on the nozzle tip side. The greater diameter portion 13 includes a straight nozzle hole 13a of a greater diameter, and the smaller diameter portion 14 includes a straight nozzle hole 14a of a smaller diameter adjacent to the nozzle hole 13a.

The smaller diameter portion 14 is provided for suppressing the flow rate of the molten glass flowing out from the nozzle 12, and the inner diameter $d_1$ of the nozzle hole 14a of the smaller diameter portion 14 is determined to be smaller than the diameter of the nozzle hole of the conventional nozzle. However, if the inner diameter $d_1$ is excessively small, the flow feature of the molten glass is deteriorated too much, and in addition, the fabrication of the nozzle hole become difficult. In consideration of these circumstances, the inner diameter $d_1$ of the nozzle hole 14a is determined in range of 0.3 mm to 1.0 mm. Further, if the length $l_1$ of the smaller diameter portion 14 is excessively long, the flow resistance become too great, and the molten glass passing through this portion is apt to be easily influenced by the atmosphere. Therefore, the length $l_1$ is usually determined smaller than 2 mm. The lower limit of the length $l_1$ will be described later.

The greater diameter portion 13 is provided for decreasing the flow resistance and passing the molten glass at a flow rate sufficient to protect the molten glass from the fluctuating cooling effect from the outside. The inner diameter $d_2$ of the nozzle hole 13a is determined greater than that of the nozzle hole 14a of the smaller diameter portion, of course, and usually, greater than 1.1 mm. However, if the diameter $d_2$ is excessively great, the amount of the molten glass staying in the nozzle become excessively great. For preventing this phenomenon, the inner diameter $d_2$ is 25 selected to be smaller than 2.5 mm.

The outer diameter of the smaller portion 14 is determined as small as possible for the purpose of decreasing the contact area between the tip of the nozzle and the molten glass drop formed at the tip of the nozzle, when the glass fibre spinning process starts, and of making it easy for the drop to fall down in a rapid and sure manner. Therefore, the thickness t of the nozzle is determined as thin as possible in a range permissible from the strength view point. For example, the thickness is about 0.3 mm in case the nozzle plate is made from platinum-rhodium alloy. The length $l_1$ of the smaller diameter portion 14 is required to be greater than 0.5 mm for the purpose of preventing the molten glass adhered to the outer surface of the nozzle from staying in the region between the smaller diameter portion and the greater diameter portion and disturbing a formation of a stable cone.

The length $l_2$ of the nozzle 12 projecting from the flat plate portion 11 is determined in range of 4 mm to 6 mm. In case of the length 12 greater than 6 mm, the flow resistance of the molten glass increases and the molten glass is apt to be influenced by the atmosphere, while in case of the length 12 smaller than 4 mm, when operated for a long time, the molten glass adhered to the outer surfaces of the adjacent nozzles is connected with each other and fill the gap between the nozzles, and in the worst case, the lower surface of the nozzle plate is wholly covered by the molten glass, thereby making it impossible to make spinning.

In the nozzle 12 which satisfies the above-mentioned requirements, the molten glass flows in a stable manner in spite of the small flow rate, and accordingly, a stable cone is formed at the tip of the nozzle. As a result, a fine glass fibre 17 can be produced without requiring any excessively high speed spinning.

Figure 4:
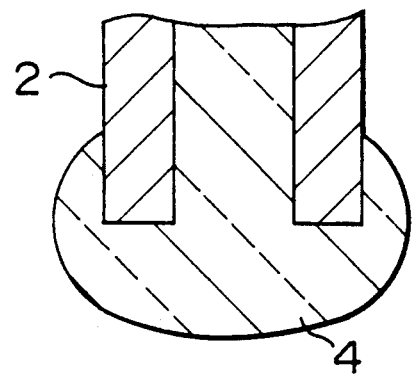
FIG. 4 is an illustration for showing a drop of the molten glass formed at the lower end of the nozzle, in case of the nozzle hole having a small diameter.
Figure 5:
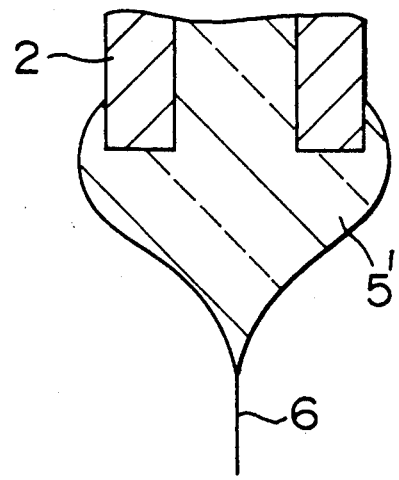
FIG. 5 is an illustration for showing a glass fibre spinning state succeeding the state shown in FIG. 4.

As for the material composing the nozzle plate 10, there is no special limitation, but platinum-rhodium alloy can be used similarly to in the prior arts. However, the platinum-rhodium alloy (for example, 10% Rh —90% Pt) has a rather small contact angle in range of 31° to 35° at the temperature of 1100° C. to 1500° C. against molten glass, and accordingly, is apt to be wetted by molten glass. As a result, when operated for a long time, the outer surface of the nozzle is gradually wetted by the glass, thereby disturbing a stable forming of a cone. Further, at a start of glass fibre spinning, the molten glass adheres to the surface of the nozzle as forming a drop of the molten glass at the tip of the nozzle, as shown in FIG. 4, thereby possibly making it impossible for the drop to fall down and for the fibre to be made. For preventing this phenomenon, a material difficult to be wetted by molten glass is preferred as the material for the nozzle plate, for example, such as platinum-gold-rhodium alloy (refer to GB Pat. No. 1,242,921 or U.S. Pat. No. 3,672,880) or platinum-gold-palladium alloy (refer to Japanese Pat. Publication No. 53-35854).

Instead of making the nozzle plate wholly from a material difficult to be wetted by molten glass, it may be also possible to make the nozzle plate itself from a usual platinum-rhodium alloy, and to provide a covering layer 18 made of a metallic material difficult to be wetted by molten glass only at the region around the exit of the nozzle 12 and at the outer peripheral portion of the nozzle adjacent to said region. By providing the covering layer 18, the use of high cost material can be decreased and the cost of the nozzle plate can be also decreased as a whole.

As for the material used for the covering larger, there is preferred a material which has a significantly greater wetting resistance against molten glass in comparison to platinum-rhodium alloy and a contact angle greater than 58 degrees against molten glass at the temperature range of 1100° C. to 1500° C. As the material for the covering layer 18, gold alloys such as the above-mentioned platinum-gold-rhodium alloy or platinum-gold-palladium alloy can be used, and further a single gold can also be used. The reason why the covering layer made of gold has a wetting resistance against molten glass is as follows. At the beginning of the operation, the gold on the nozzle surface is in a molten state, because the melting point of gold is 1063° C., and the nozzle surface is never wetted by the glass. After then, the gold and the nozzle metal together produces an alloy under the function of the heat generated in the operation, and the contact angle against molten glass become greater than 60 degrees similarly to in case of platinum-rhodium alloy containing gold. Needless to say, materials other than the above-mentioned ones can be used.

The covering layer 18 can be formed by a known method such as vacuum deposition, spattering or plating. The thickness of the covering layer 18 is determined in range of 50 μm to 400 μm, preferably 100 μm to 300 μm. In case of the thickness smaller than 50 μm, the effect can not be maintained for a long time, and even if the thickness is made greater than 400 μm, the continuation of the effect does not have a significant change.

For improving the close adhesion between the covering layer 18 and the nozzle surface, the covering layer may be baked for a short time at a temperature higher than the spinning temperature by 50° C. to 100° C.

Since, in a nozzle plate for spinning glass fibre according to the present invention, a nozzle hole 14a of a smaller diameter is provided below a nozzle hole of a greater diameter as shown in FIG. 1, the flow rate of the molten glass can be made small, and the molten glass passing through the nozzle hole is not easily influenced by the environmental conditions. As a result, the flow of the molten glass is stable and a stable cone is formed at the tip of the nozzle. Further, since the flow rate of the molten glass is suppressed at a low level, a fine fibre can be obtained without increasing the spinning speed. Thus, a fine glass fibre of high quality having a diameter smaller than 3 μm can be manufactured without suffering any trouble such as a breakaway of the fibre.

Figure 2:
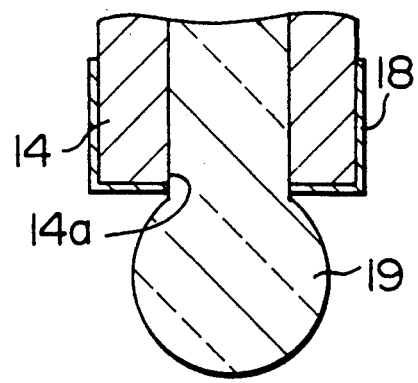
FIG. 2 is an enlarged sectional view of a nozzle tip according to another embodiment.

Further, in case where the nozzle surface is covered by a metallic material difficult to be wetted as shown in FIG. 2, the molten glass rarely spreads on the outer surface of the nozzle, when the spinning is started or restarted and the molten glass flows out from the nozzle tip and forms a drop, and as soon as a small drop 19 is formed as shown in FIG. 2, the drop quickly falls down and a glass fibre surely connected with the cone produced at the nozzle portion can be formed. In consequence, in spite of the decreased flow rate of the molten glass through the nozzle, the spinning operation can be easily started. In addition since the glass drop quickly falls down, the molten glass contacts with the outer surface only for a short time and wets the nozzle in a limited area, thereby assuring a long and stable operation.

Examples according to the present invention are described below.

EXAMPLE 1

The nozzle tip portion of the nozzle plate made from platinum-rhodium alloy and having a shape known in FIG. 1 (inner diameter $d_1$ of the smaller diameter portion : 0.6 mm, outer diameter of the smaller portion : 1.2 mm, length $l_1$ of the smaller diameter portion : 0.8 mm, inner diameter $d_2$ of the greater diameter portion : 1.2 mm, nozzle length 1:2 5 mm) is plated by gold through electroplating with a plating thickness of 200 μm, thereby forming a covering layer 18 as shown in FIG. 2. Glass fibres have been manufactured by using the above-mentioned nozzle plate under conditions in which the depth of the molten E-glass is 10 m, the spinning speed is 2500 m/min, and the spinning temperatures are 1320° C., 1250° C., and 1220° C. corresponding to the fibre diameters 2.5 μm, 2.0 μm, and 1.8 μm, respectively. The result is shown in Table 1.

EXAMPLE 2

The tip portion of the same nozzle plate as in Example 1 is coated with gold of 100 μm thickness through vacuum deposition, and then, heated at 1350° C. for 0.5 hour, thereby forming a covering layer of platinum-gold alloy on the surface of the nozzle. Fibres of E-glass have been manufactured by use of this nozzle plate under the same condition as in Example 1. The result is shown in Table 1.

EXAMPLE 3

No covering layer is provided on the nozzle of the nozzle plate which is the same as in Example 1. Glass fibres have been manufactured under the same condition as in Example 1, and the result is shown in Table 1.

REFERENCE EXAMPLE 1

Figure 3:
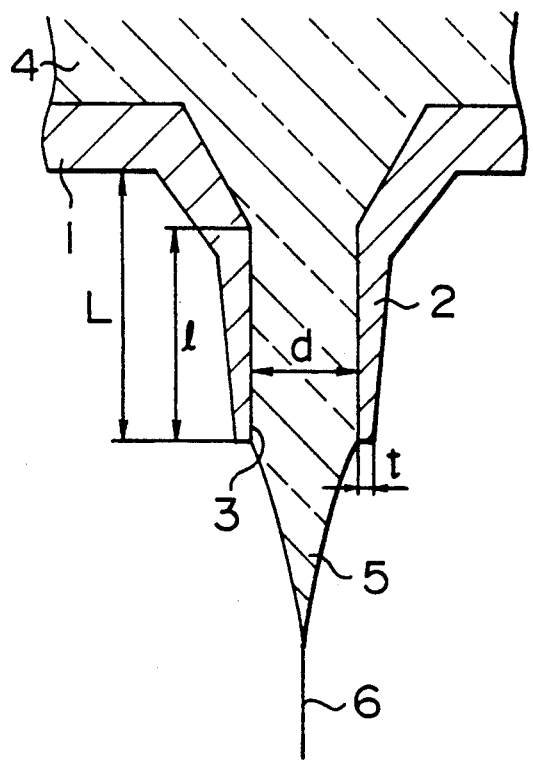
FIG. 3 is an enlarged sectional view of main part of a nozzle plate of a prior art.

By use of a nozzle plate having a shaped shown in FIG. 3 and made of platinum-rhodium family alloy (nozzle inner diameter d : 1.3 mm, tip outer diameter : 1.9 mm, nozzle length L : 5 mm), glass fibres have been manufactured under the same condition as in Example 1. The result is shown in Table 1.

TABLE 1

| | Diameter of Manufactured Fibre (μm) | | |
|---|---|---|---|
| | 2.5 | 2.0 | 1.8 |
| Example 1 | O | O | Δ |
| Example 2 | O | O | Δ |
| Example 3 | O | Δ | X |
| Reference Example 1 | Δ | X | X |

O: stable spinning is possible
Δ: spinning is possible, but a little unstable
X: spinning is impossible Since, as mentioned above, each nozzle on the nozzle plate according to the present invention is composed of a greater diameter portion and a smaller diameter portion adjacent thereto, the molten glass can be flowed with a small flow rate in a stable manner, and a fine glass fibre can be manufactured without requiring a high spinning speed. As a result, a fine, for example, thinner than 3 μm, glass fibre of high quality can be manufactured without suffering frequent breakdown of the fibre.

If a covering layer having a great wetting resistance against the molten glass is provided at the tip of the nozzle, it prevents the drop of the molten glass from spreading on the outer surface of the nozzle when a spinning is started or restarted, thereby assuring a fall down of the drop and a start of the spinning. Further, since the molten glass does not wet the exit of the nozzle, there is no fear that the glass adhered around the nozzle disturbs the flow of the molten glass in making a glass fibre, and a stable condition for making glass fibre is assured. This advantage is specially helpful when a fine glass fibre is to be manufactured. Further, since there is almost no fear that the molten glass spreads on the outer surface of the nozzle, the space between the adjacent nozzles can be smaller. Since the amount of the material of the covering layer to be used is small, the cost of the nozzle plate can be suppressed, even if the price of the material is high.

We claim:

1. A nozzle plate for spinning glass fibre, comprising a flat plate portion and a plurality of nozzles projecting from said flat plate portion, each of said nozzles comprising a greater diameter portion located at the flat plate portion side thereof and a smaller diameter portion located at the tip side thereof, the inner diameter and the length of said smaller diameter portion being in range of 0.3 mm to 1.0 mm and in range of 0.5 mm to 2.0 mm, respectively, the inner diameter of said greater diameter portion being in range of 1.1 mm to 2.5 mm, and the length of each of said nozzles projecting from said flat plate portion being in range of 4.0 mm to 6.0 mm, said nozzles each having an exit with an outer face and having an outer peripheral portion immediately adjacent to said face, both of said outer peripheral portion and said outer face being covered by a metallic material having a contact angle greater than 58 degrees against molten glass at a temperature of 1100° C. to 1500° C., said metallic material differing in composition from said nozzles.

2. A nozzle plate for spinning glass fibre as claimed in claim 1, wherein said nozzle plate is made of platinum-gold-rhodium alloy.

3. A nozzle plate for spinning glass fibre as claimed in claim 1, wherein said nozzle plate is made of platinum-gold-palladium alloy.

4. An arrangement for spinning glass fibre, comprising:
a flat plate portion;
a plurality of elongated nozzles projecting from said flat plate portion each defining a channel therethrough, each of said nozzles having an inlet portion and an exit portion, said inlet portion being closer to said flat plate portion than is said exit portion and being of a greater diameter than said exit portion, said exit portion having an inner periphery which defines a portion of said channel, said exit portion having an outer face which is outside of said channel and extends radially outward from a location immediately adjacent to said inner periphery to a radially outward location, said exit portion also having an outer peripheral portion extending in the direction of elongation of the nozzle from said radially outward location towards said flat plate portion, and
a metallic layer coating said face and said outer peripheral portion, the metallic layer having a contact angle greater than 58 degrees against molten glass at a temperature of 1100° C. to 1500° C., said metallic layer differing in composition from said nozzles.

5. A nozzle plate for spinning glass fibre claimed in claim 1, wherein the thickness of said covering layer of the metallic material is in range of 50 82 m to 400 μm.

6. A nozzle plate for spinning glass fibre as claimed in claim 1 or claim 5, wherein said nozzle plate is made of platinum-rhodium alloy, and said metallic material composing said covering layer is platinum-gold-rhodium alloy.

7. A nozzle plate for spinning glass fibre as claimed in claim 1 or claim 5, wherein said nozzle plate is made of platinum-rhodium alloy, and said metallic material composing said covering layer is platinum-gold-palladium alloy.

8. A nozzle plate for spinning glass fibre as claimed in claim 1 or claim 5, wherein said nozzle plate is made of platinum-rhodium alloy, and said metallic material composing said covering layer is gold.

9. An arrangement as in claim 4, wherein said metallic layer is composed of a material selected from the group consisting of platinum-gold-rhodium alloy, platinum-gold-palladium alloy, and gold.

* * * * *